(12) United States Patent
Kirshenbaum

(10) Patent No.: US 8,799,310 B2
(45) Date of Patent: Aug. 5, 2014

(54) METHOD AND SYSTEM FOR PROCESSING A UNIFORM RESOURCE LOCATOR

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 12/842,434

(22) Filed: Jul. 23, 2010

(65) Prior Publication Data

US 2012/0023127 A1 Jan. 26, 2012

(51) Int. Cl.
*G06F 17/30* (2006.01)

(52) U.S. Cl.
USPC .......................................... 707/769

(58) Field of Classification Search
USPC ............................ 707/769, 708, 778, 999.006
See application file for complete search history.

(56) References Cited

U.S. PATENT DOCUMENTS

| | | | | |
|---|---|---|---|---|
| 6,286,053 B1 * | 9/2001 | Van Peursem et al. | ....... | 709/247 |
| 6,311,216 B1 | 10/2001 | Smith et al. | | |
| 6,411,952 B1 * | 6/2002 | Bharat et al. | ............. | 1/1 |
| 6,556,983 B1 * | 4/2003 | Altschuler et al. | .............. | 706/55 |
| 7,197,530 B2 * | 3/2007 | Mehra et al. | .................. | 709/202 |
| 7,464,122 B1 * | 12/2008 | Basko et al. | .......................... | 1/1 |
| 7,472,167 B2 | 12/2008 | Tarquini | | |
| 7,523,171 B2 | 4/2009 | Burckart et al. | | |
| 7,590,707 B2 | 9/2009 | McCloy, III et al. | | |
| 7,614,004 B2 * | 11/2009 | Milic-Frayling et al. | ...... | 715/762 |
| 7,747,678 B2 * | 6/2010 | Mehra et al. | .................. | 709/203 |
| 7,937,655 B2 * | 5/2011 | Teng et al. | ..................... | 715/255 |
| 2003/0231203 A1 * | 12/2003 | Gallella | ........................ | 345/738 |
| 2008/0034073 A1 * | 2/2008 | McCloy et al. | .............. | 709/223 |
| 2009/0144447 A1 | 6/2009 | Wittig et al. | | |
| 2009/0164485 A1 * | 6/2009 | Burke et al. | .................. | 707/100 |
| 2009/0327304 A1 * | 12/2009 | Agarwal et al. | ................. | 707/10 |
| 2012/0054192 A1 * | 3/2012 | Song et al. | .................... | 707/741 |

* cited by examiner

*Primary Examiner* — Mohammed R Uddin

(57) ABSTRACT

The present disclosure provides a computer-implemented method of processing a Uniform Resource Locator (URL). The method includes generating a plurality of lattice nodes based on a URL, wherein each of the plurality of lattice nodes includes a host component corresponding to a portion of the URL and a path component corresponding to a portion of the URL. The method also includes identifying one of the plurality of lattice nodes as a search node. The method also includes searching a pattern table database using the search node to find a matching pattern table entry, the pattern table database comprising a plurality of pattern table entries corresponding to known lattice nodes associated with previously encountered URLs. The method also includes processing the URL based on whether the matching pattern table entry was found in the pattern table database.

20 Claims, 9 Drawing Sheets

METHOD AND SYSTEM FOR PROCESSING A UNIFORM RESOURCE LOCATOR

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The online activity of millions of Website users generates an enormous database of potentially useful information regarding the desires of customers and trends in Internet usage. Understanding the desires and trends of online users may allow a business to better position itself within the online marketplace.

However, processing such a large pool of data to extract the useful information presents many challenges. For example, the different online entities that generate electronic documents may use different techniques or codes to represent similar information. Techniques for identifying the significance of certain information may not be readily available.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
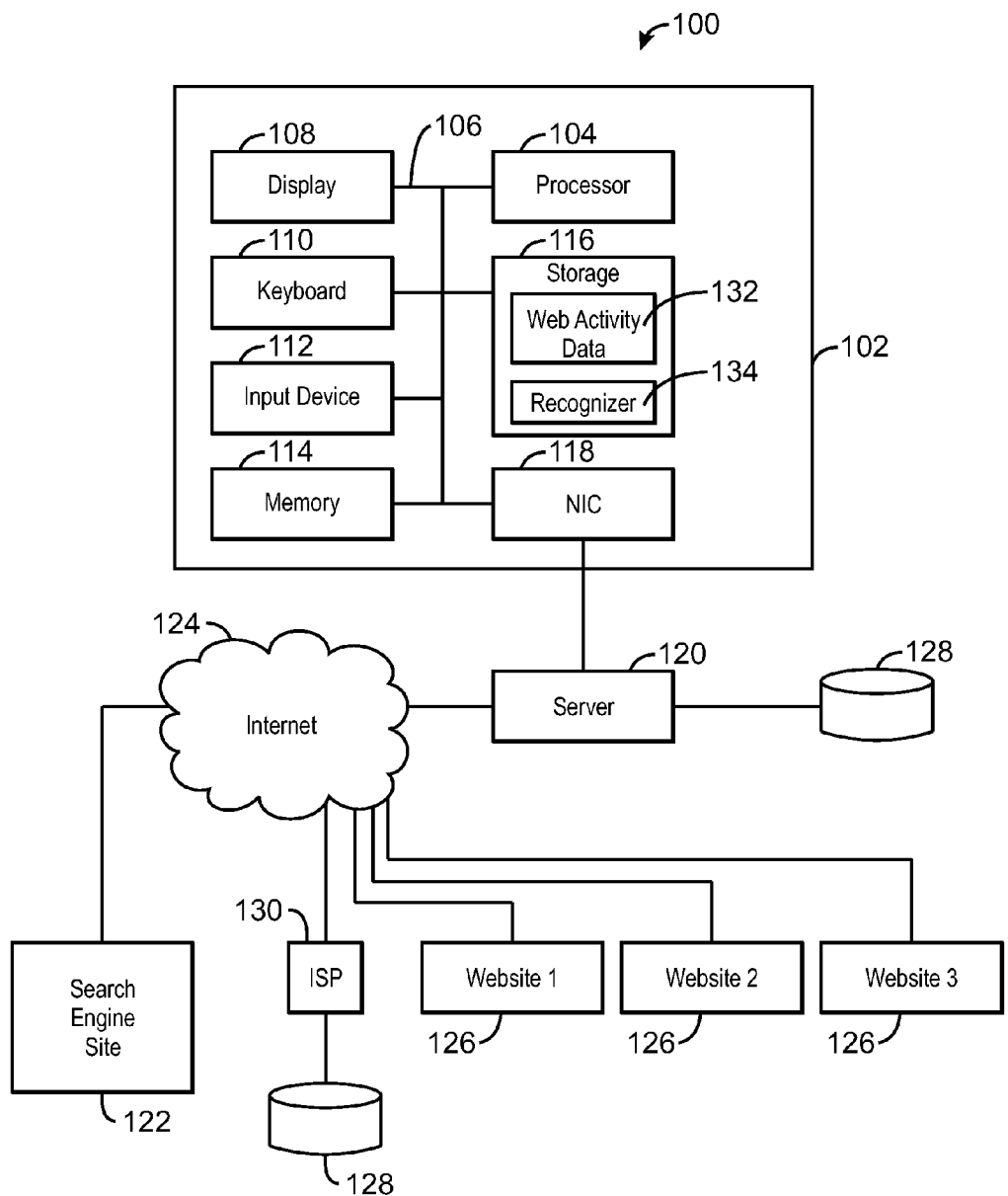
FIG. 1 is a block diagram of a system that may be used to process URLs, in accordance with exemplary embodiments of the present invention.

Exemplary embodiments of the present invention provide techniques for analyzing the Web activity of a large number of Internet users across a variety of different Websites using uniform resource locators (URLs), Uniform Resource Identifiers (URIs), and any other similar address information used to refer to a remote interaction. As used herein, the term "exemplary" merely denotes an example that may be useful for clarification of the present invention. The examples are not intended to limit the scope, as other techniques may be used while remaining within the scope of the present claims.

In an exemplary embodiment of the present invention, a collection of raw electronic data is obtained for a plurality of online entities and users. The raw data may include a plurality of URLs generated by visitors to various Websites. In some embodiments, the raw data includes the URLs visited by a single user. A recognizer may be used to process the URLs to extract the useful information contained therein. The recognizer may tag the URLs as belonging to particular category. The URLs may be query URLs generated by search forms and including search terms chosen or entered by a user. The recognizer may identify the search terms in the query URL, which may be used to provide various metrics regarding Internet activity across a range of users and Websites or the interests of a single user. Techniques for using search terms extracted from query URLs to generate such metrics are discussed further in the commonly assigned U.S. patent application Ser. No. 12/618,151, filed on Nov. 13, 2009, entitled "Method and System for Processing Web Activity Data," by George Forman, et al., which is hereby incorporated by reference as though fully set forth in its entirety herein.

As described further below, the recognizer may receive a URL and generate a URL pattern lattice that includes a plurality of lattice nodes, each node corresponding to a different level of abstraction of the URL host and path. The lattice nodes of the URL pattern lattice may be used to search a table, referred to herein as a pattern table (or pattern table database), which includes pattern table entries corresponding to known lattice nodes that are associated with previously encountered URLs about which certain information is known and which imply a desire to further process URLs whose lattices contain nodes that match. The entries in the pattern table and their corresponding lattice nodes are referred to herein as "patterns of interest." Upon finding a matching pattern table entry, the URL may be further processed according to the specific use case. For example, in a case wherein a binary decision is being made about the URL, such as whether the URL corresponds to a specified category, the recognizer may tag the URL as belonging to the specified category upon finding a matching pattern table entry in the pattern table. In some embodiments, additional information regarding the URL is obtained from a data table upon finding a matching pattern table entry in the pattern table.

The process of using the lattice nodes of the URL pattern lattice to search the pattern table may be referred to as "walking the lattice." The recognizer may employ various techniques for increasing the speed and efficiency with which the URL pattern lattice is walked. For example, as discussed further below, the search results for the lattice nodes at a higher level of abstraction may be used to indicate whether a matching pattern table entry may potentially exist for a lattice node at a lower level of abstraction. To improve the speed and efficiency with which the recognizer walks the URL pattern lattice, additional tables may be provided, such as a guard table and a guard state table. As discussed further below, the guard table and guard state table may be used to indicate whether the patterns of interest may potentially exist in the pattern for lattice nodes at lower levels of abstraction.

FIG. 1 is a block diagram of a system that may be used to process URLs, in accordance with exemplary embodiments of the present invention. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the system 100 may include a computing device 102, which will generally include a processor 104 connected through a bus 106 to a display 108, a keyboard 110, and one or more input devices 112, such as a mouse, touch screen, or keyboard. In an exemplary embodiment, the device 102 is a general-purpose computing device, for example, a desktop computer, laptop computer, business server, and the like. The computing device 102 can also have one or more types of non-transitory, computer readable media, such as a memory 114 that may be used during the execution of various operating programs, including operating programs used in exemplary embodiments of the present invention. The memory 114 may include read-only memory (ROM), random access memory (RAM), and the like. The device 102 can also include other non-transitory, computer readable media, such as a storage system 116 for the long-term storage of operating programs and data, including the operating programs and data used in exemplary embodiments of the present invention.

In an exemplary embodiment, the device 102 includes a network interface controller (NIC) 118, for connecting the device 102 to a server 120. The computing device 102 may be communicatively coupled to the server 120 through a local area network (LAN), a wide-area network (WAN), or another network configuration. The server 120 may have a non-transitory, computer readable media, such as storage device, for storing enterprise data, buffering communications, and storing operating programs of the server 120. Through the server 120, the computing device 102 can access a search engine site 122 connected to the Internet 124. In exemplary embodiments of the present invention, the search engine 122 includes generic search engines, such as GOOGLE™, YAHOO®, BING™, and the like. The computing device 102 can also access Websites 126 through the Internet 124 by generating an HTTP query resulting in an HTML document, or other suitable techniques. Each of the Websites 126 can include a single Webpage or multiple Webpages arranged in a hierarchical tree. Although the Websites 126 are actually virtual constructs that are hosted by Web servers, they are described herein as individual (physical) entities, as multiple Websites 126 may be hosted by a single Web server and each Website 126 may collect or provide information about particular users. Further, each Website 126 will generally have a separate identification, such as a uniform resource locator (URL), and will function as an individual entity.

The Websites 126 may also provide search functions, for example, searching subpages to locate products or publications provided by the Website 126. For example, the Websites 126 may include sites such as EBAY®, AMAZON.COM®, WIKIPEDIA™, CRAIGSLIST™, CNN.COM™, and the like. Further, the search engine site 106 and one or more of the Websites 126 may be configured to monitor the online activity of a visitor to the Website 126, for example, regarding searches performed by the visitor. As used herein, the term "online activity" refers to any activity that may be performed over a network, for example, accessing Webpages on the Internet, performing searches, providing data to a Website, and the like.

The computing device 102 and server 120 may also be able to access a database 128, which may be connected to the server 120 through the local network or to an Internet service provider (ISP) 130 on the Internet 124, for example. The database 128 may be used to store a collection of Web activity data 132 to be processed in accordance with exemplary embodiments of the present inventions. As used herein, a "database" is an integrated collection of logically related data that consolidates information previously stored in separate locations into a common pool of records that provide data for an application.

The computing device 102 may also include a collection of Web activity data 132, which may be processed in accordance with the techniques described herein to generate statistical data that may be useful to identify various market characteristics and trends. In exemplary embodiments of the present invention, the Web activity data 132 is stored, for example, in the storage system 116, and may include Web activity data 132 for a plurality of Internet browsers generated at a plurality of Websites. For example, the Web activity data 132 may include records of the Web pages clicked on by individual browsers, the Hyper Text Markup Language (HTML) or eXtensible Markup Language (XML) content of Web pages, the results of Web searches that have been performed at various Websites, and the like. The Web activity data 132 may also include URL data, for example, a collection of query URLs that represent searches performed by a Web browser. The Web activity data 132 may be provided to the computing device 102 via a storage medium, for example, the database 128, a portable storage medium such as a compact disk (CD), and the like.

The computing device 102 may also include a recognizer 134 that may be used to automatically process each of the URLs in the Web activity data 132. As used herein, the term "automatically" is used to denote an automated process performed by a machine, for example, the processor 104 of the computing device 102. It will be appreciated that various processing steps may be performed automatically even if not specifically referred to herein as such. In exemplary embodiments, the recognizer 134 may be used to identify a URL as belonging to one or more specified categories. In some embodiments, the recognizer 134 may be used to identify a target class of information such as a search term entered or selected by the user and included in a query field of a URL. As used herein, a search term may be any term entered or selected by a user that indicates an interest of the user. Furthermore, the target class of information may be information that was selected from a list of options provided by a Web form, for example, selected by clicking on a link or selected from a drop-down menu or other list.

The recognizer 134 may include, or at least have access to, one or more information tables, which are used by the recognizer 134 to identify the useful information contained in the URL. The recognizer 134 may process each URL in the Web activity data 132 by using the URL to search the information tables. To search the information tables, a plurality of lattice nodes may be generated in the storage system 116 using the URL, wherein the lattice nodes represent various levels of abstraction of the host name and the path name. One or more of the plurality of lattice nodes may be identified or selected as a search node, and a corresponding hash code may be generated and used to search the pattern tables. The plurality of lattice nodes may be represented by a data structure referred to herein as a URL pattern lattice. Embodiments of the present invention may be better understood with reference to FIG. 2.

Figure 2:
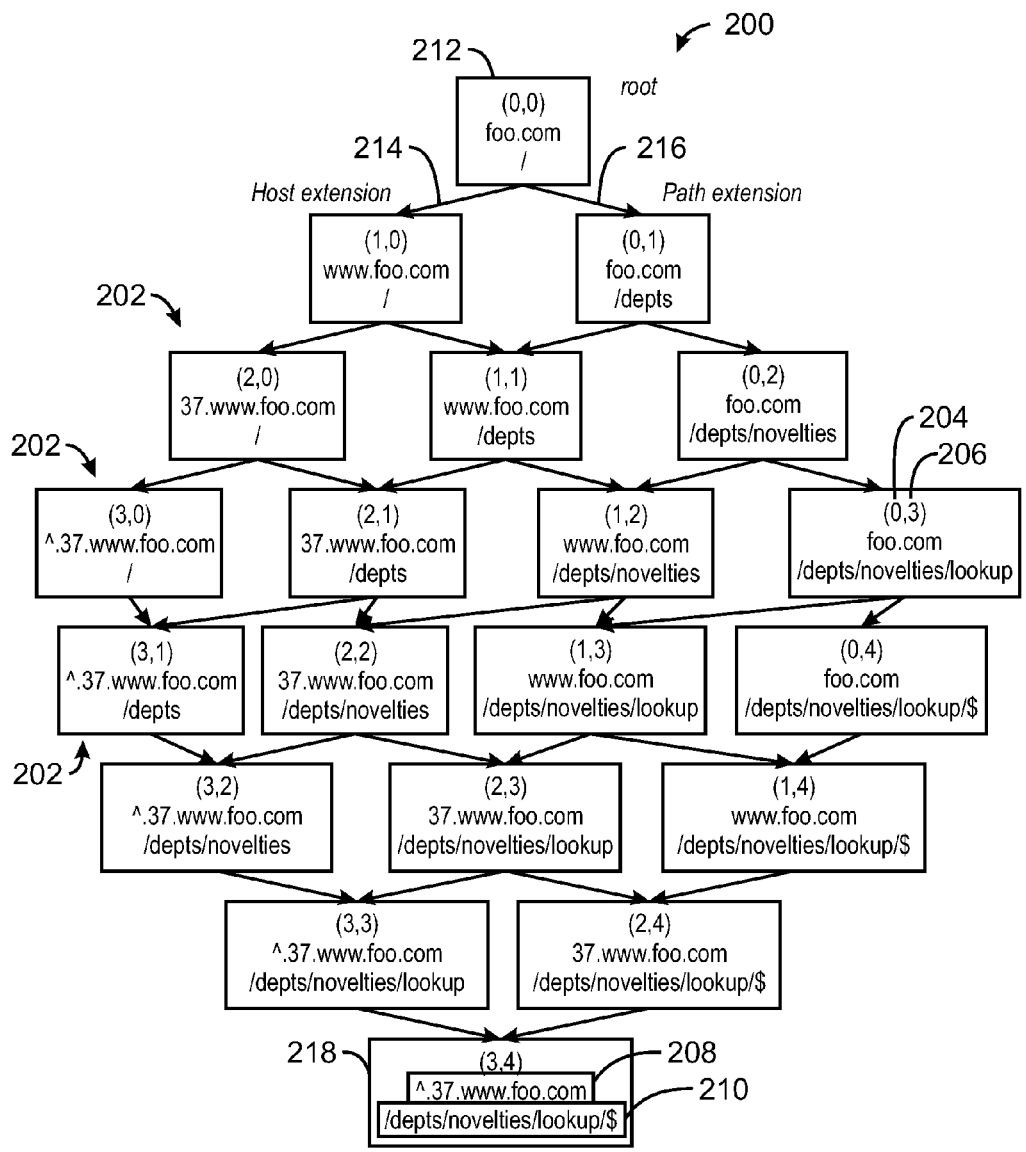
FIG. 2 is a diagram of a URL pattern lattice generated from one of the URLs in the Web activity data, in accordance with exemplary embodiments of the present invention.

FIG. 2 is a diagram of a URL pattern lattice generated from one of the URLs in the Web activity data 132, in accordance with exemplary embodiments of the present invention. The URL pattern lattice 200 shown in the example of FIG. 2 was generated using a hypothetical query URL:

http://www37.foo.com/depts/novelties/
lookup?k1=v1&k2=v2&k3=v3

In the above query URL, the host is the portion of the URL that precedes the first single forward slash, in this case "http://www37.foo.com", the path is everything from the first single forward slash (when one exists) that precedes the question mark, in this case "/depts/novelties/lookup", and the query portion of the query URL is everything that follows the question mark. Furthermore, the query portion of the query URL may include one or more data fields, which may be separated by ampersands. Each data field may include a data field name, for example, "k1", and a data field value, for example, "v1". In the example query URL provided above, the query URL includes three data fields, namely "k1", which has the value "v1", "k2", which has the value "v2", and "k3", which has the value "v3".

It will be appreciated that the naming convention used herein is hypothetical and that any suitable character string may be used to represent the various data field names and values used in an actual query URL. The naming convention used in the query URL may be an ad hoc convention designated for a single Web form or Website. Therefore, a common naming convention used across the multiple Websites is typically not available. For example, a hypothetical search field named "q" may refer to different types of data. In one query URL, "q" may refer to data field that holds a search term entered by a user. However, in another query URL, "q" may refer to something different, for example a data field that holds a desired quantity of a product.

The URL pattern lattice 200 may be represented as a lattice structure that includes a plurality of lattice nodes 202. Each lattice node 202 may include a set of indices, including a host index 204 and a path index 206, both of which correspond with the relative position of the lattice node 202 in the URL pattern lattice 200. Each lattice node 202 corresponds to a portion of the URL that includes a host component 208 and a path component 210, both obtained by parsing the URL. The host component 208 may represent a suffix of the URL host. In other words, the host component 208 "foo.com" represents any URL host that ends in "foo.com". The path component 210 may represent a prefix of the URL path. In other words, the path component 210 "/depts" represents any URL path that begins with "/depts". Thus, in the above example, during the search of the pattern table using the lattice node 202 "foo.com/depts", a matching pattern table entry 402 will exist if, based on previously encountered URLs or otherwise, it has been determined that URLs are of interest if their lattices include such a node or, equivalently, that the URL's host ends in "foo.com" and its path begins with "/depts".

Additionally, the host and path components may include an indication that a particular host component 208 or path component 210 represents the exact host or path, as opposed to a host suffix or path prefix. In the example depicted in FIG. 2, the character "^" is used to indicate the exact host, while the character "$" is used to indicate the exact path. It will be appreciated that other characters or other means of indication may be used. These indications are used to obtain matching pattern table entries corresponding to an exact match between the host or path of the lattice node 202 and the previously encountered URL. For example, the lattice node 202 corresponding to "foo.com/depts/novelties/lookup/$" will return a matching pattern table entry 402 if URLs including a host ending with "foo.com" and the exact path "/depts/novelties/lookup" are of interest. Whereas, the lattice node 202 "foo.com/depts/novelties/lookup" (without the dollar sign) will return a matching pattern table entry 402 if one of the previously encountered URLs included a host ending with "foo.com" and any path beginning with "/depts/novelties/lookup".

The URL pattern lattice 200 includes a root node 212, a most-general node for the URL, which corresponds to the highest level of abstraction of the host component 208 and path component 210 represented in the URL pattern lattice 200. For example, the root node 212 shown in FIG. 2 includes a host component 208 of "foo.com" and a path component 210 of "/". The URL pattern lattice 200 may also include more than one root node. Each node 202 includes a host extension 214 and a path extension 216 which connects the root node 212 to its corresponding child nodes. Along the host extension 214, the host component 208 is expanded to include a larger portion of the URL host, resulting in a lower level of abstraction of the host component 208. For example, as shown in FIG. 2, the host extension 214 of the root node 212 leads to a child node with a host component 208 of "www.foo.com" and a path component 210 "/". Along the path extension 216, the host component 208 is expanded to include a larger portion of the URL path, resulting in a lower level of abstraction of the path component 210. For example, as shown in FIG. 2, the host extension 214 of the root node 212 leads to a child node with a host component 208 "foo.com" and a path component 210 "/depts". Each of the lattice nodes nodes may have corresponding host and path extensions, depending on whether a lower level of abstraction exists for the host component 208 or path component 210 of the lattice node. As used herein the term "child node" refers to a lattice node that is directly below the corresponding parent lattice node as indicated by the host extension 214 and path extension 216. Each child node corresponds to a minimal extension of either the host component 208 or the path component 210 as compared to the child node's parent node. In some embodiments, some child nodes correspond with an extension of the parent node that includes an Internet Protocol port indication or keyword/value pair from the query portion of the URL. In other embodiments, child nodes correspond to other types of extensions of the parent node with respect to the URL. In some embodiments, the URL may include a plurality of "component types", of which "host" and "path" are examples, each of which may admit a sequence of refinements with respect to the URL.

The URL pattern lattice 200 may also include a base node 218 that represent the lowest level of abstraction of the URL. For example, as shown in FIG. 2, the base node 218 includes a representation of the exact URL, namely "^.37.www.foo.com/depts/novelties/lookup/$", which may be a normalized URL, as discussed further below in relation to FIG. 3.

It will be appreciated that URL pattern lattice 200 as depicted in FIG. 2 is a model used to better explain embodiments of the present invention. In exemplary embodiments, the lattice nodes 202 of the URL pattern lattice 200 may be generated as needed for searching the pattern table. In particular, the arrows of FIG. 2 should not be construed as implying the presence of "pointers" or "references" from parent lattice nodes 202 to child lattice nodes 202 in the memory of computing device 102 nor should FIG. 2 be construed as implying that all or even a plurality of the lattice nodes 202 of the URL pattern lattice 200 are realized at any given time. In exemplary embodiments, the data used to generate the URL pattern lattice 200 is stored in a set of URL tables. Techniques for generating the lattice nodes 202 of the URL pattern lattice 200 may be better understood with reference to FIG. 3.

Figure 3:
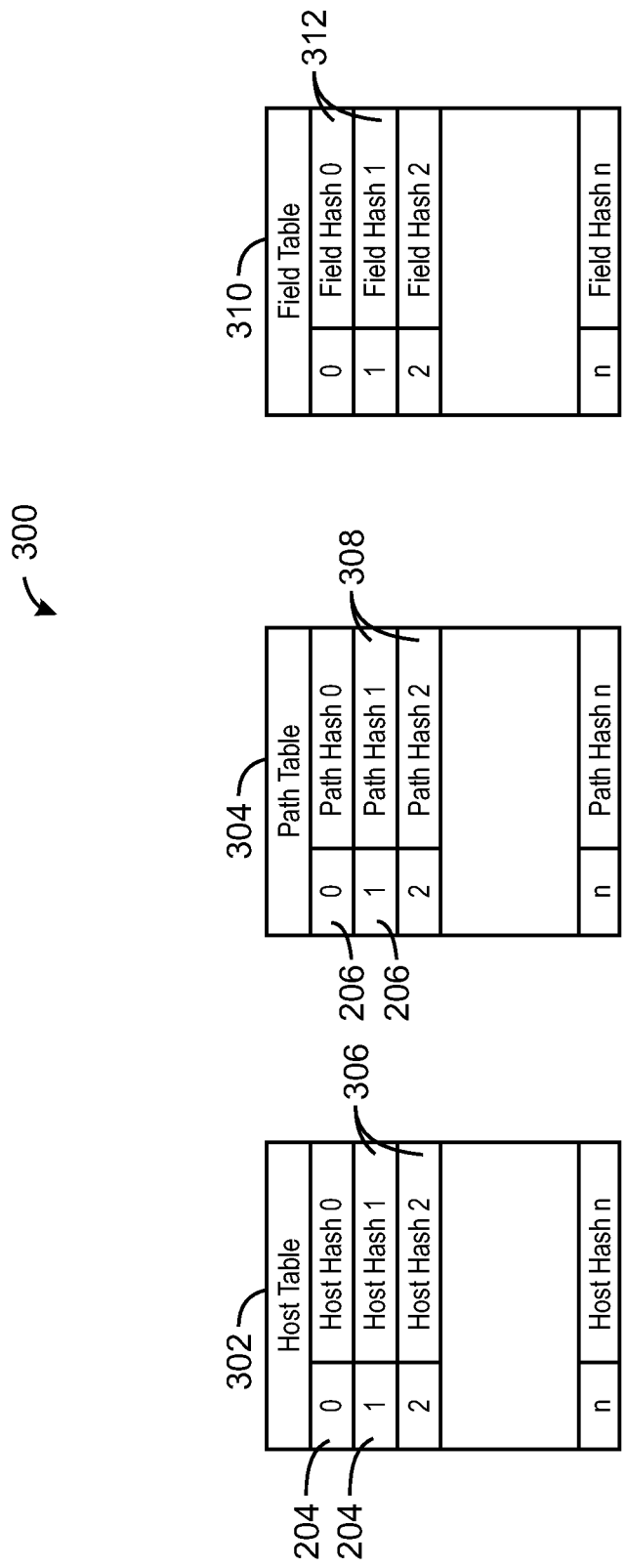
FIG. 3 is a set of URL tables that hold the information corresponding to the URL pattern lattice, in accordance with exemplary embodiments of the present invention.

FIG. 3 is a set of URL tables that hold the information corresponding to the URL pattern lattice 200, in accordance with exemplary embodiments of the present invention. The URL tables may be stored to memory 114, for example in a database. The URL tables may include a host table 302 and a path table 304, which may be represented as arrays, lists, or any other representation that has the properties that it is possible to look up a value given an index or other reference to an entry and that it is possible to determine an index or reference to a next entry given an index or reference. In general, there may be a table corresponding to each component type used by the embodiment. It should be noted that the indexes 204, 206 depicted in FIG. 3 are for clarity only and may not actually be present in the representation of host table 302 or path table 304.

Each entry of the host table 302 includes a hash code, referred to as a host hash 306, corresponding to each of the host components 208 generated from the URL. Each entry of the path table 304 includes a hash code, referred to as a path hash 308, corresponding to each of the path components 210 generated from the URL. Together, the path table 304 and host table 302 may be used to generate a combined hash code corresponding to each lattice node 202 of the URL pattern lattice 200 as needed for searching the pattern table. The hash codes may be generated using any suitable hashing algorithm. Exemplary embodiments for generating a hash code are described in the commonly assigned U.S. patent application Ser. No. 12/570,309, filed on Sep. 30, 2009, entitled "Method and System for Processing Text," by George Forman, et al., which is hereby incorporated by reference as though fully set forth in its entirety herein. The hashing algorithm described in the above referenced application may be referred to herein as the "MASH" algorithm.

To generate the host table 302, the URL may be parsed into host components 208 using dots as delimiters. Each dot-delimited string of characters may be referred to as a "host segment." To generate the host components 208 a hash code is generated for each host segment using a hashing algorithm. A first hash code is generated for the rightmost host segment and added to the host table 302 at index 0. Each successive host component hash is generated by rotating, right-shifting or otherwise modifying the previous hash code, generating a new hash code for the next leftward host segment, and adding or otherwise injecting the new hash code to the previous hash code of the previous host component 208. An additional host component 208 is generated and added to the host table 302 by creating a fictitious host segment to represent an exact match, where this additional host segment has a predefined hash code, such as the result of using the hashing algorithm on a predefined string such as "A" or "!EXACT MATCH!". In some embodiments, rather than combining hash codes generated for each host segment, the hashing algorithm is applied to data representing the sequence of host segments that correspond to each host component 208. In some embodiments, either due to the particular hashing algorithm used or due to a prior normalization step, certain characters in the host segments (for example, corresponding upper- and lower-case characters) may be treated as equivalent. Each successive hash code is added to the host table 302 in order of abstractness, from more abstract to less abstract, until the host of the URL is fully parsed.

In some embodiments, it may not be useful to include all or part of the top-level domain (TLD) of the URL, for example ".com" or ".co.uk", as a separate host component 208. Thus, the host segment representing the TLD of the URL may be combined with the next leftward host segment to form a single most-general host component 208. In some embodiments, a table of known TLDs may be used to identify the TLD of the URL.

Additionally, some host components 208 may be further processed to transform the host components 208 to a normalized form. For example, if one of the host segments includes textual characters and ends with a number, the text portion and the number portion may be treated as two different host components 208. For example, the host segment "www37" or "www-37" would generate the host components "www" and "37", each of which would be stored to a separate entry of the host table 302. Further, the host components 208 may be re-ordered so that the number portion precedes the host portion when the corresponding lattice node 202 is generated, as shown in FIG. 2. The normalization rules applied to the host components 208 will generally also be used for generating the pattern table.

Following the example URL described in relation to FIG. 2, the generation of the hash codes entered into the host table 302 may be represented by the following formulas:

Host Hash 0=$H$(foo.com)=$h$(foo.com)

Host Hash 1=$H$(www.foo.com)=($H$(foo.com)<<1)+$h$ (www)

Host Hash 2=$H$(37.www.foo.com)=($H$(www.foo.com) <<1)+$h$(37)

Host Hash 3=$H$(^.37.www.foo.com)=($H$(37.www.foo.com)<<1)+$h$(^)

In the above formulas, capital "H" represents the hash code being used in the current invention and lowercase "h" represents an underlying hashing algorithm (also known as a "message digest algorithm") such as Message-Digest Algorithm 5 (MD5), Secure Hash Algorithm 1 (SHA-1), or MASH. In the above formulas, the operator ">>1" represents a shift or rotation of the bits of the hash code one bit to the right. Note that the index of each host component hash corresponds to the host index shown in FIG. 2. Additionally, it will be appreciated that the URL components included in the host table 302 may not represent semantically meaningful segments of the URL.

Additionally, the host name may also be checked to ensure that the host name is of a form that may reasonably be expected to return a matching pattern table entry. For example, if the host is of a "dotted quad" form such as "15.4.3.23" or if the host ends in square brackets it is likely that the host name is an IP address and will not match any pattern table entry, in which case, the URL may be ignored and the processing of the URL may terminate.

To generate the path table 304, the URL may be parsed into path components 210 using slashes as delimiters. Each slash-delimited string of characters may be referred to as a "path segment." To generate the path components 210 a hash code is generated for each path segment using a hashing algorithm. A first hash code is generated for the leftmost, empty string, path segment and added to the path table 304 at index 0. In some embodiments, the hash code of the empty string may be a constant. Each successive path component hash is generated by rotating, right-shifting, or otherwise modifying the previous hash code, generating a new hash code for the next rightward path segment, and adding or otherwise injecting the new hash code to the previous hash code of the previous path component 210. An additional path component 210 is generated and added to the path table 304 creating a fictitious path segment to represent an exact match, where this additional path segment has a predefined hash code, such as the result of using the hashing algorithm on a predefined string such as "$" or "!EXACT MATCH!". In some embodiments, rather than combining hash codes generated for each path segment, the hashing algorithm is applied to data representing the sequence of path segments that correspond to each path component 210. In some embodiments, either due to the particular hashing algorithm used or due to a prior normalization step, certain characters in the path segments (for example, corresponding upper- and lower-case characters) may be treated as equivalent. Each successive hash code is added to the path table 304 in order of abstractness, from more abstract to less abstract, until the path of the URL is fully parsed.

Following the example URL described in relation to FIG. 2, the generation of the hash codes entered into the path table 304 may be represented by the following formulas:

Path Hash 0 = $H(/)$ = constant

Path Hash 1 = $H(/depts) = (H(/) << 1) + h(depts)$

Path Hash 2 = $H(/depts/novelties) = (H(/depts) << 1) + h(novelties)$

Path Hash 3 = $H(/depts/novelties/lookup) = (H(/depts/novelties) << 1) + h(lookup)$ In the above formulas, the operator "<<1" represents a shift or rotation of the bits of the Hash code one bit to the right. Note that the index of each path component hash corresponds to the path index 206 shown in FIG. 2. Additionally, it will be appreciated that the URL components included in the path table 304 may not represent semantically meaningful segments of the URL.

Additionally, some path components 210 may be further processed to transform the path components 210 to a normalized form. For example, if a path component 210 other than the first path component 210 is empty, such as in "depts//novelties", a constant may be substituted for the hash of the string rather than running the hashing algorithm on the empty string. Furthermore, the path may also be delimited on other characters in addition to slashes, such as, ":", "=", and "_". The normalization rules applied to the path components 210 will generally also be used for generating the pattern table.

The host table 302 and the path table 304 define the entire URL pattern lattice 200 shown in FIG. 2. The host index 204 and path index 206 of each lattice node 202 corresponds to the indices into the host table 302 and path table 304. A combined hash code corresponding to each lattice node 202 may be obtained by combining the host hash 306 and path hash 308 at the corresponding table entries, by rotation and addition. For example, following the example provided in FIG. 2, lattice node 202 (0, 3) corresponds to "foo.com/depts/novelties/lookup", and its hash code is computed by the following formula:

$H(foo.com/depts/novelties/lookup) = (H(foo.com) >> 1) + H(/depts/novelties/lookup)$ In the above formula, the hash code H(foo.com) is obtained from index 0 of the host table 302, and the hash code H(/depts/novelties/lookup) is obtained from index 3 of the path table 304. The root node 212 of the URL pattern lattice 200 is position (0,0), "foo.com/", corresponding to any path in any host in domain "foo.com". The base node 218 of the URL pattern lattice 200 is position (3,4), "^.37.www.foo.com/depts/novelties/lookup/$", corresponding to precisely the host and path found in the URL. The links between the lattice nodes are implicit in the indexing of the host table 302 and the path table 304. Each host extension 214 refers to the lattice node 202 corresponding to incrementing the host table index by one, and each path extension 216 refers to the lattice node 202 corresponding to incrementing the path table index by one. So from node (1,2), "www.foo.com/depts/novelties", the host extension 214 is (2,2), "37.www.foo.com/depts/novelties" and the path extension 216 is (1,3), "www.foo.com/depts/novelties/lookup". Determining whether a host extension 214 or path extension 216 exists for any given lattice node 202 can be determined by checking the length of the appropriate host table 302 or path table 304.

The set of URL tables may also include a field table 310 that includes an entry, referred to as a field hash 312, for each field name included in the URL. The field table 310 may be utilized as described further below to determine which, if any, of the URL query fields included in the URL corresponds to a search term or other target class of information for that particular URL.

To generate the field table 310, the query portion of the URL may be parsed into data field name components, for example, by using the equal signs and ampersands as delimiters. A hash code is generated for each data field name and added to the field table 310. Following the example URL described in relation to FIG. 2, the generation of the hash codes entered into the field table 310 may be represented by the following formulas:

Field Hash 0 = $h(k1)$

Field Hash 1 = $h(k2)$

Field Hash 2 = $h(k3)$

To obtain a search node for searching the pattern table, a combined hash code may be obtained by combining one of the host table entries and one of the path table entries, as explained further below in reference to FIG. 5. In exemplary embodiments, the combined hash codes are generated as needed for searching the pattern table. Methods for searching the pattern table are described in relation to FIGS. 5-7. Methods of searching the pattern table may be better understood with reference to FIG. 4, which shows an exemplary pattern table and data table as well as additional information tables that may be used improve the speed and efficiency of the pattern table search.

Figure 4:
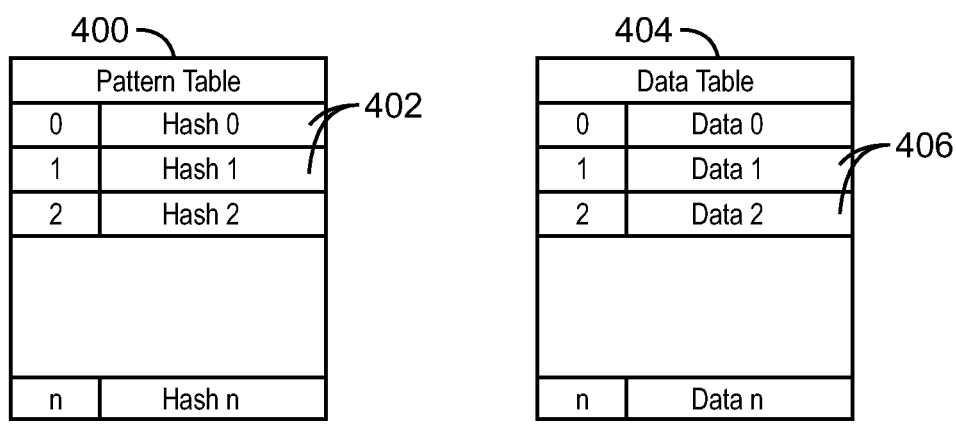
FIG. 4 is a set of information tables which are used by the recognizer to identify the useful information contained in the URL, in accordance with exemplary embodiments of the present invention.

FIG. 4 is a set of information tables which are used by the recognizer 134 to identify the useful information contained in the URL, in accordance with exemplary embodiments of the present invention. The information tables may be generated based on the output of a classifier that analyzes a collection of raw URL data that includes the previously encountered URLs. For example, the classifier may be generated by a training system that receives input from a trainer, for example, a person that visually inspects a portion of the raw URL data and labels certain data fields within the raw URL data as belonging to a specified target class. The labels provided by the trainer may be used to generate the classifier. For example, the classifier 114 may be generated using a supervised machine-learning algorithm, for example, a Naïve Bayes algorithm, support vector machine, or the like. Additionally, the classifier may include a pattern matching system, decision-making system, regressed functions system, evolved programs, or machine learning systems, among others. Exemplary techniques for generating a classifier are discussed further in the commonly assigned U.S. patent application Ser. No. 12/618,159, filed on Nov. 13, 2009, entitled "Method and System for Developing a Classification Tool,"

by Evan R. Kirshenbaum, et al., which is hereby incorporated by reference as though fully set forth in its entirety herein.

The output of the classifier may be used to generate the information tables that are used by the recognizer 134 to process the newly encountered URLs included in the Web activity data 132. The information tables may be stored to the storage system 116, for example, in a database. Exemplary techniques for generating the information tables used by the recognizer 134 are discussed in the commonly assigned and U.S. patent application Ser. No. 12/861 736, filed on Aug. 23, 2010, entitled "Method and System for Processing a Group of Uniform Resource Locators," by Evan R. Kirshenbaum, which is hereby incorporated by reference as though fully set forth in its entirety herein.

In exemplary embodiments, the information tables include a pattern table 400. Each pattern table entry 402 may include a hash code corresponding to known lattice nodes of previously encountered URLs, about which certain information is known. The hashing algorithm used to generate the hash codes of each pattern table entry 402 is the same algorithm used to generate the hash codes corresponding to the URL pattern lattice 200. The pattern table entries 402 may be sorted according to the hash code values. Furthermore, the hashing algorithm may be chosen to provide an even distribution of hash codes over the range of possible hash codes.

In exemplary embodiments, the information tables may also include a data table 404. Each data table entry 406 may provide data related to a corresponding entry in the pattern table 400, for example, the same index. Upon finding a matching pattern table entry 402, data may be obtained from the corresponding entry in the data table 404. For example, the data may include a category indicator that may be used to categorize the URL. In some exemplary embodiments, the data table 406 contains a sorted list of hash codes corresponding to combinations of hash codes in the pattern table 400 and other values. In an exemplary embodiment, each data table entry 406 includes a hash code corresponding to a combination of a known lattice node of a previously encountered URL and a data field name for that previously encountered URL. The presence of the data table entry 406 may be used to indicate that the data field corresponding to the data field name represents a target class of information for those URLs that match the corresponding known lattice node. Upon finding a matching pattern table entry 402, the data table 404 may be searched to identify the data fields of the URL that correspond with the target class of information, as described further below, in reference to FIG. 5. The data table 404 may be generated in conjunction with the pattern table 400, using the output of the classifier as described in the U.S. patent application Ser. No. 12/861,736, referenced above.

Figure 5:
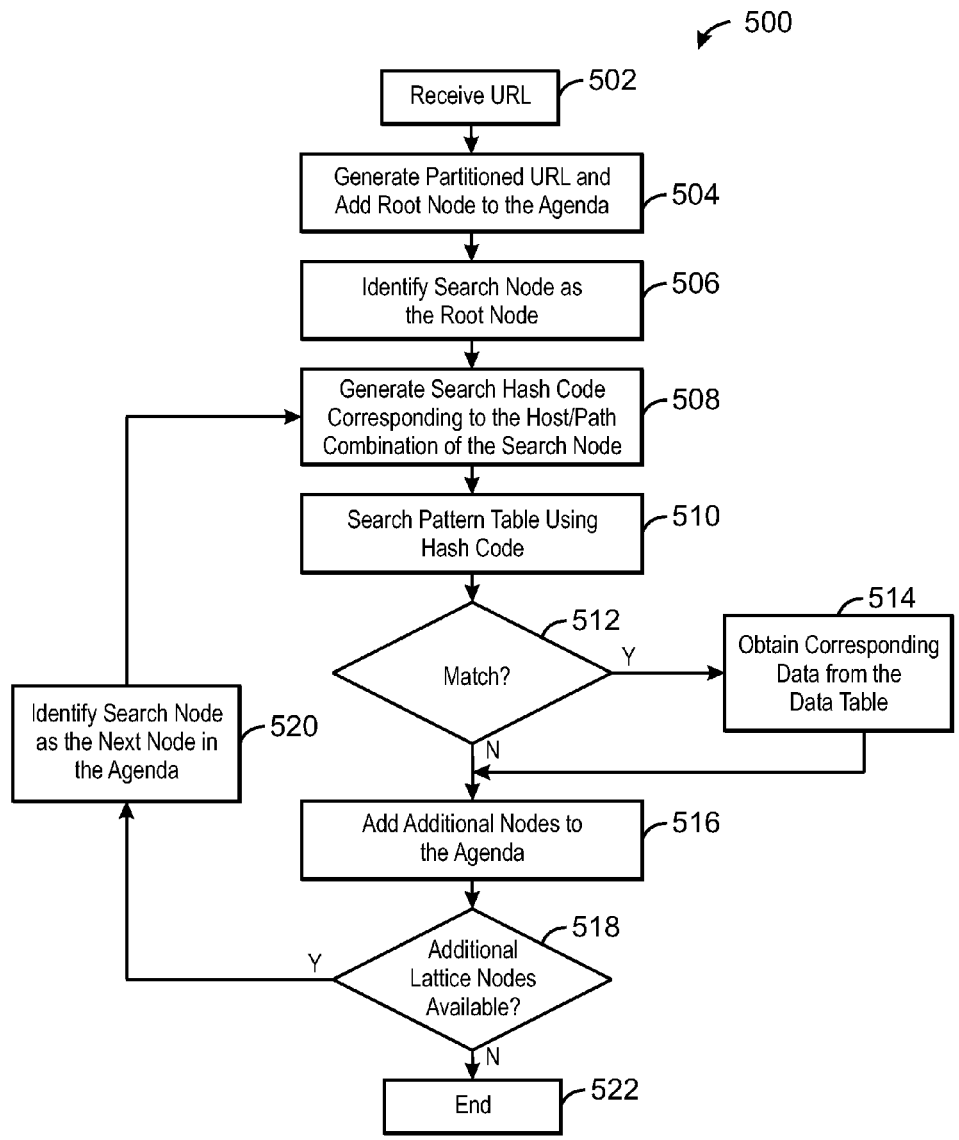
FIG. 5 is a process flow diagram of an overview of a method of processing a URL using the information tables of the recognizer, in accordance with exemplary embodiments of the present invention.

FIG. 5 is a process flow diagram of an overview of a method of processing a URL using the information tables of the recognizer 134, in accordance with exemplary embodiments of the present invention. The method is generally referred to by the reference number 500 and may be performed by the processor 104 using the recognizer 134, as discussed with respect to FIG. 1, above. The method 500 may begin at block 502, wherein a URL is received, for example, the URL may be received from the Web activity data 132.

At block 504, a URL pattern lattice 200 may be generated as described above in relation to FIG. 3. At this stage, the URL pattern lattice 200 may be represented as an array of host hashes stored to the host table 302 and an array of path hashes stored to the path table 304. Additionally, if the URL includes a query field, the field table 310 may be populated with the field hashes 312 corresponding to each of the data field names included in the query field. Also at block 504, the root node 212 of the URL pattern lattice 200 may be added to an agenda. The agenda includes a list of pending lattice nodes 202 that may be used to search the pattern table 400. Each entry in the agenda may include an indication of the pending lattice nodes 202 it contains, such as a pair of indices, referred as the "host probe index" and the "path probe index," which correspond to the host index and path index of a corresponding lattice node 202. As described further below, the agenda may be populated with additional pending lattice nodes 202 depending on the results pattern table search. In some embodiments, the agenda may be fully populated, at block 504, with all of the lattice nodes 202 included in the URL pattern lattice 200.

At block 506, the search node may be identified as the root node 212 of the URL pattern lattice 200 by obtaining the host probe index and path probe index included in first entry of the agenda, or setting both the host probe index and path probe index to zero. The term "search node" refers to the particular lattice node 202 that will be used to search the pattern table 400 in a particular iteration of the algorithm.

At block 508, a combined hash code corresponding to the host and path combination of the search node may be generated. The combined hash code may be referred to herein as a "search hash code." To generate the search hash code, the host hash 306 corresponding to the search node may be obtained from the host table 302 using the host probe index, and the path hash 308 corresponding to the search node may be obtained from the path table 304 using the path probe index. The search hash code can be generated by shifting or rotating the host hash 306 and adding the result to the path hash 308.

At block 510, the pattern table 400 may be searched using the search hash code computed for the search node to find a matching pattern table entry 402. A binary search algorithm may be used to find the matching pattern table entry 402, if one exists. During the binary search, there is an active range (initially the entire table) and a probe is made at the midpoint of this range. If the hash code at the probe location corresponds to the search hash code, a match is noted. Otherwise, if the value at the probe location is greater than the search hash code, the upper bound on the active range is set to be one position below the probe point and a new probe point is selected. If the value at the probe location is less than the search hash code, the lower bound on the active range can be set to be one position above the probe point and a new probe is selected. If the range becomes empty, it can be determined that there is no pattern table entry that matches the search hash code.

It will be appreciated that a "match" between hash codes may not refer to a strict equality of the hash codes. For example, if the number of bits in the computed hash code is different from the number of bits in the hash codes of the pattern table, the comparison of the hash codes may be based on a comparison of a set of bits of the computed hash code with a same size set of bits from the pattern table hash code. In some exemplary embodiments, a matching hash code may be a hash code having a value within some specified distance of the computed hash code, based on subtraction, number of bits in common, or other suitable technique.

Additionally, because the hashing algorithm used to generate the pattern table 400 results in hash codes that are very nearly uniformly distributed throughout the range, the speed of the binary search may be increased by selecting a probe location according to the following formula:

$$\text{Probe} = \text{lower} + \frac{\text{target} - val(\text{lower})}{val(\text{upper}) - val(\text{lower})}$$

In the above formula, probe is the index of the next probe location, lower is the lower index in the current range, target is the search hash code corresponding to the search node, val(lower) is the pattern table hash code at the lower index of the current range, and val(upper) is the pattern table hash code at the upper index of the current range. The above formula may result in a maximum number of probes of the pattern table 400 approximately equal to $\text{Log}_2(\text{log}_2(k))$, where k equals the number of entries in the pattern table 400.

At block 512, a determination is made regarding whether a pattern table entry 402 matching the search node was found at block 510. If a match was found, the process flow may advance to block 514, wherein data may be obtained from the data table 404. In cases where a match is found, the process for obtaining data from the data table 404 will vary depending on the particular application. In some embodiments, the data to be obtained from the data table 404 will be at an index corresponding to the index of the matching pattern table entry 402. The data may include some item of information that may be useful for processing or categorizing the URL, for example, a URL category, class, label, score, policy, rule, and the like. In some embodiments the identified data may include a Boolean value indicating the presence of a match, which may be identified in addition to or instead of consulting the data table 404, which may not exist in embodiments in which such a Boolean value is the only value of interest.

Continuing at block 514, the data table 404 may be used to determine whether one of the data fields in the query portion of the URL corresponds to a target class such as a search term provided by a user. Each entry in the data table 404 may include a hash code corresponding to a combination of a known lattice node of a previously encountered URL and a data field name for that previously encountered URL. The combination of the known lattice node with the data field name may be used to indicate that the data field name has been used to indicate a search term in other previously encountered URLs that correspond with the same known lattice node. Finding the matching pattern table entry 402 may indicate that search node may correspond with one or more entries in the data table 404. The data table 404 may then be searched to determine whether one of the data fields included in the URL is a data field that has been previously identified as a search term field.

To search the data table 404, the hash code corresponding to the search node may be combined with one of the hash codes included in the field table 310, for example, by rotating and adding. The new hash code may be used to search the data table 404 for a matching entry in the data table 404. The presence of a matching entry in the data table 404 indicates that the field corresponding to the field hash 312 is of the target class, for example, a data field that includes a search term, referred to herein as a "search term field." The above process may be iterated for each of the hash codes included in the field table 310. In this way, each of the fields of the URL may be evaluated to identify which, if any, of the query fields of the URL are of the target class.

In some embodiments, after finding a matching pattern table entry, the process flow terminates. In some embodiments, the process flow advances to block 516 and the pattern table is further searched using another lattice node 202.

At block 516, one or more additional lattice nodes 202 may be added to the agenda. Adding a pending lattice node 202 to the agenda may include incrementing one or both of the host probe index and the path probe index, and adding an indication of the lattice node 202 corresponding to the resulting indices to the agenda. The order in which the pending lattice nodes are added will determine the order with which the URL lattice is walked. In some embodiments, the lattice is walked in a breadth-first manner, with lattice nodes added to the end of the agenda, in which case the levels of the URL pattern lattice 200 may be walked in order from the root node 212 to the base node 218. In some embodiments, the lattice is walked in a depth-first manner, with lattice nodes added to the front of the agenda, in which case, the host extensions may be progressively walked before advancing to the next path extension 216, or vice-versa. The lattice may be walked in any suitable order, thus it will be appreciated that the order in which the lattice is walked is not a limitation of the present invention. In some embodiments, it can be determined that all of the lattice nodes have already been processed or are not worth processing based on previous search results, in which case additional lattice nodes 202 will not be added to the agenda. Furthermore, pending lattice nodes may be removed from the agenda after the pending lattice node has been processed, in other words, used as the search node. In some embodiments, the URL pattern lattice 200 may be walked through the use of recursive calls, in which case the agenda may be eliminated.

At block 518, a determination is made regarding whether there is another pending lattice node 202 in the agenda. If another pending lattice node 202 is available, the process flow may advance to block 520. At block 520, the search node is identified as the next pending lattice node 202 in the agenda and is removed from the agenda. The process flow may then return to block 508, wherein the new search node may be processed as discussed above. To avoid searching for matches for the same lattice node 202 multiple times, a record may be maintained of the lattice nodes 202 in the URL pattern lattice 200 that have been used as search nodes. This record may be in the form of a set or table of lattice nodes 202, by an indication in an object representing each lattice node 202, or otherwise. In some embodiments, the record is represented as an array of Boolean values, each of which corresponds to a lattice node 202. When a lattice node 202 has been used as the search node, or if it has been determined that a lattice nodes is not worth searching, the lattice node 202 may be marked in the record as "walked." When a pending lattice node 202 is identified as a search node, this record may be consulted to determine whether the search node has already been processed, or is otherwise marked as "walked." If the search node is marked as walked, the next pending lattice node 202 that would next be identified as a search node is so identified. The process may be repeated until a search node is identified that has not been marked as "walked" or until it is determined that there are no more pending lattice nodes 202. If, at block 518, there are no additional lattice nodes 202 in the agenda, the process flow advances to block 522.

At block 522, the process flow terminates and an output may be generated. In some embodiments, the recognizer 134 returns some or all of the data identified as related to the URL as its output. In some embodiments, the recognizer 134 performs other actions upon identifying data as related to the URL. Such actions may include storing the data or invoking a caller-provided callback routine. In some embodiments, if no data is identified as related to the URL, default data is returned or used to perform actions. In some embodiments, the default data is pre-specified data. In other embodiments, default data is based on data previously identified as related to other URLs by the recognizer 134. In some embodiments, the recognizer 134 can receive an additional URL from the Web activity data 132, and the method 500 restarts at block 502 with the new URL.

It will be appreciated that, in some cases, the method described in FIG. 5 will result in each lattice node 202 being walked. However, it will often be the case that none of the lattice nodes 202 will have a corresponding match in the pattern table 400, due to the URL not being similar enough to one of the previously encountered URLs used to generate the pattern table 400. In exemplary embodiments, the URL pattern lattice 200 can be processed faster by making an early determination regarding whether a matching pattern table entry 402 is likely to be found before walking the entire lattice. More efficient and faster techniques for walking the lattice are discussed in reference to FIGS. 6-9.

Figure 6:
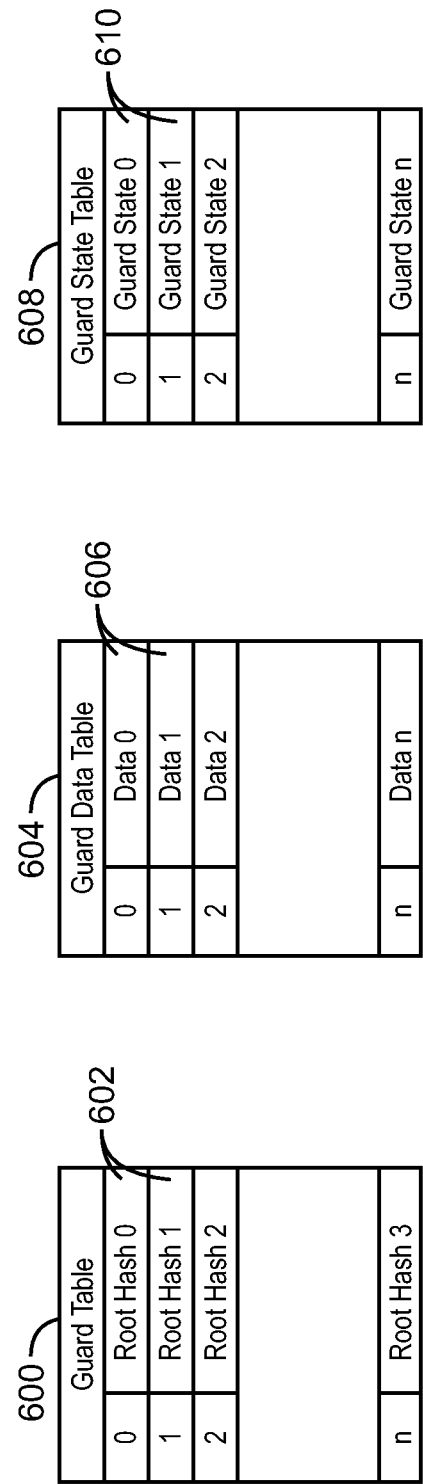
FIG. 6 is another set of information tables that are used by the recognizer to improve the speed and efficiency of the recognizer, in accordance with exemplary embodiments of the present invention.

FIG. 6 is another set of information tables that are used by the recognizer 134 to improve the speed and efficiency of the recognizer 134, in accordance with exemplary embodiments of the present invention. In some embodiments, the additional information tables include a guard table 600. The guard table 600 can include a sorted collection of guard table entries 602, each entry containing a hash code corresponding to the root node 212 of a URL pattern lattice 200 that contains a lattice node 202 corresponding to a pattern in the pattern table 400. Each pattern in the pattern table 400 may have a corresponding guard table entry 602. Further, several pattern table entries may share the same guard table entry 602. Using the guard table 600, the method of FIG. 5 may be modified by looking for a matching entry in the guard table 600 for the root node 212 of the URL pattern lattice 200 before looking for a match in the pattern table 400. If the root node 212 does not match any of the entries in the guard table 600, this indicates that none of the URL pattern lattices 200 will return a matching pattern table entry 402, and the process flow may terminate for that URL. Otherwise, if the root node 212 does match one of the entries in the pattern table 400, processing of the URL pattern lattice 200 may proceed as described above in relation to FIG. 5. In some embodiments, the root node 212 will be looked up twice, once in the guard table 600, and once in the pattern table 400.

In exemplary embodiments, additional efficiency can be obtained by excluding the root positions of the previously encountered URLs from the pattern table 400. Furthermore, an additional guard data table 604 may be added to the set of information tables used by the recognizer 134. The guard data table 604 includes data entries 606 pertaining to the root positions of the previously encountered URLs. Thus, if a matching guard table entry 602 is found for the root node 212, the corresponding data may be obtained from the guard data table 604 in the same manner as described above in reference to block 514 of FIG. 5. The other nodes in the URL pattern lattice 200 may then be used to search the pattern table 400.

In exemplary embodiments, the information tables used by the recognizer 134 also include a guard state table 608. In exemplary embodiments, the guard state table 608 includes a corresponding guard state 610 for each entry in the pattern table 400. In some embodiments, the guard state table 608 is used instead of guard table 600, and the guard table 600 and guard data table 604 can be eliminated. Each of the guard states 610 in the guard state table 608 may be used to indicate whether the corresponding pattern table entry 402 in the pattern table 400 is a pattern of interest. If the pattern table entry is a pattern of interest, additional data may exist in the data table 404 for that pattern table entry 402. Each guard state 610 may also be used to indicate whether a pattern of interest may exist in the pattern table 400 at a lower level of abstraction of the known lattice node of the corresponding pattern table entry 402. In other words, the guard state entry can serve as an indication of whether other lattice nodes 202 obtained by recursively extending the search node may be patterns of interest. Upon finding a matching pattern table entry 402 during a search of the pattern table 400, the guard state 610 at the same index as the matching pattern table entry 402 may be obtained to determine whether the data table 404 will be searched and whether sub nodes of the search node should be used to search the pattern table 400. As used herein, a sub node is considered to be any node in the URL pattern lattice 200 that descends, directly or indirectly, from the search node. For example, with reference to FIG. 2, node (2,3) can be considered a sub node of node (2,0). However, node (1,3) would not be considered a sub node of node (2,0). In exemplary embodiments, additional pending lattice nodes are added to the agenda based on the guard state 610. Embodiments of a method of walking the URL pattern lattice 200 using the guard state table 608 may be better understood with reference to FIG. 7. The guard table 600, guard data table 604, and guard state table 608 may be generated in conjunction with the pattern table 400, using the output of the classifier as described in the U.S. patent application Ser. No. 12/861 736, referenced above.

Figure 7:
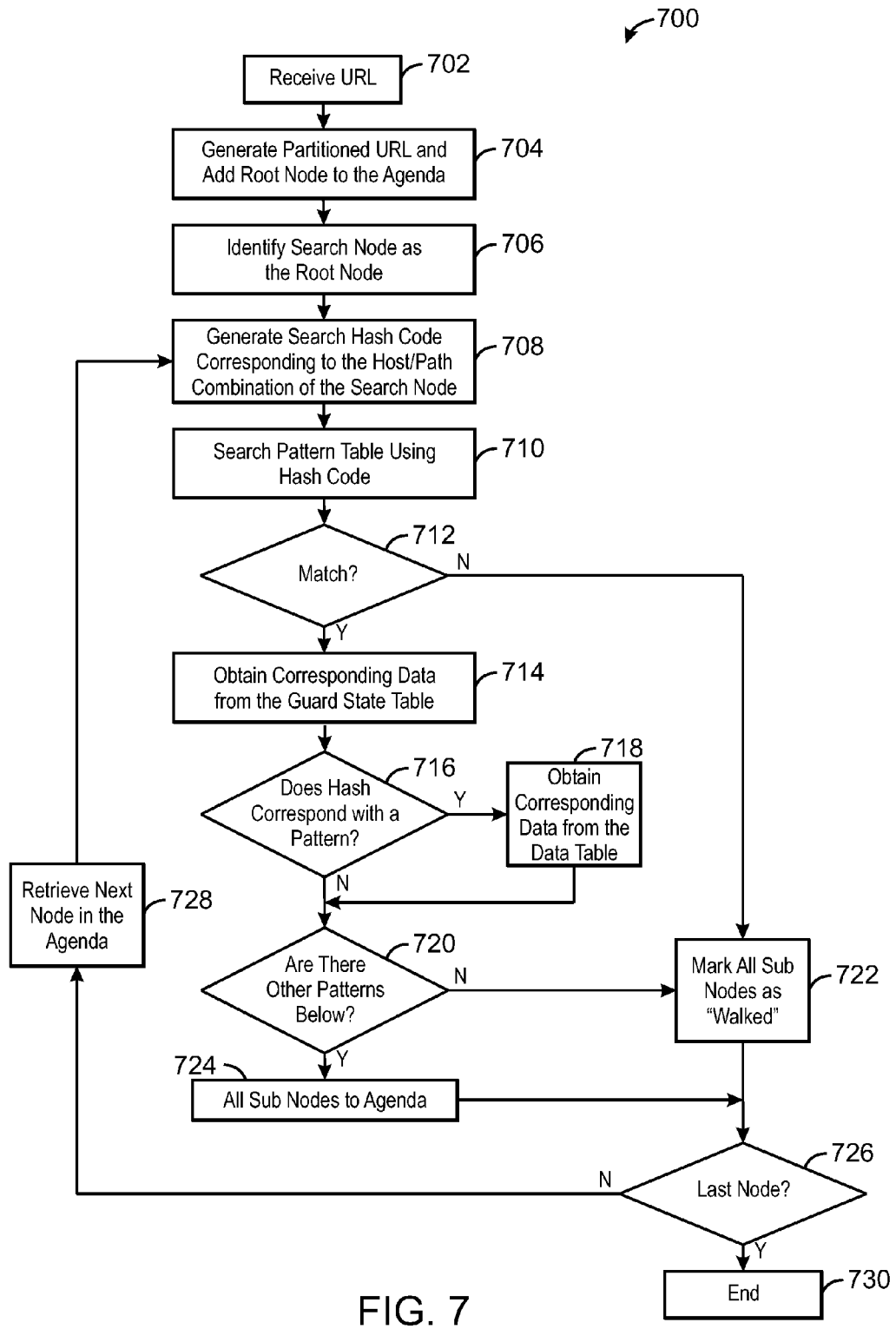
FIG. 7 a process flow diagram of a method of processing a URL using the guard state table, in accordance with exemplary embodiments of the present invention.

FIG. 7 a process flow diagram of a method of processing a URL using the guard state table 608, in accordance with exemplary embodiments of the present invention. The method is generally referred to by the reference number 700 and may, for example, be performed by the processor 104 using the recognizer 134, as described with respect to FIG. 1, above. Blocks 702-710 may proceed in a substantially similar manner as described in relation to the corresponding blocks 502-510 of method 500 described in relation to FIG. 5. At block 702, the URL is received from the Web activity data. At block 704, the plurality of lattice nodes 202 may be generated as described above in relation to FIG. 3, and the root node may be added to the agenda. At block 706, the search node may be identified as the first pending lattice node 202 in the agenda. The search hash code corresponding to the search node may be generated at block 708, using the host table 302 and the path table 304, as described above in relation to FIG. 3. At block 710, the pattern table 400 may be searched using the search hash code computed for the search node to find a matching pattern table entry 402.

At block 712, a determination is made regarding whether a pattern table entry 402 matching the search node was found at block 710. If a match was found, the process flow may advance to block 714, wherein the corresponding guard state 610 in the guard state table 608 is obtained. As discussed above, the guard state 610 can include two indicators. One of the indicators indicates whether the matching pattern table entry 402 is a pattern of interest, in which case, corresponding data may be found in the data table 404. The other indicator indicates whether patterns of interest may be found for sub nodes of the search node. The indicators contained in the guard state table 608 are used at blocks 716 and 720.

At block 716, a determination is made regarding whether the search node corresponds to a pattern of interest. As noted above, this determination is based on one of the indicators provided by the guard state table 608. If the search node is identified as a pattern of interest, the process flow may advance to block 718, wherein the corresponding data may be obtained from the data table 404, as described above in relation to block 514 of FIG. 5.

Furthermore, in exemplary embodiments, the object of the method 700 is to answer a binary question regarding the URL. For example, the method 700 may be used to determine which of two possible categories apply to the URL. For example, the method 700 may be used to determine whether the URL is or is not a query URL. This determination may be sufficient depending on the particular use case. In some embodiments, additional information will not be acquired for the search node, and block 718 may be eliminated. Thus, the guard state 610 alone may serve to characterize the URL. For example, if the guard state 610 indicates that the URL is a pattern of interest, then the URL may be assigned to category "X." If the guard state 610 indicates that the URL is not a pattern of interest, the URL may be assigned to category "Y."

In addition to the description provided in block 514 of FIG. 5, further tracking procedures can be employed at block 718 to handle cases in which matching pattern table entries are found for more than one lattice node 202. If matching pattern table entries are found for more than one lattice node 202, the recognizer 134 may also find more than one item of data in the data table 404 corresponding to the URL, which may or may not conflict with the previously acquired data. For example, in embodiments wherein the object of the recognizer 134 is to identify the data fields of the query URL that correspond with search terms, conflicting data may be identified for different lattice nodes. This may happen, for example, if a previously encountered URL uses query field keywords that have different meanings for different pathnames. In cases where conflicting data is obtained for different lattice nodes, the recognizer 134 may override previous data upon finding additional patterns for the same URL.

In exemplary embodiments, values associated with lower positions in the URL pattern lattice 200 override values associated with higher positions. For example, this would enable the recognizer 134 to assign URLs that end with the host name "foo.com" to class X, while also assigning URLs that end with the host name "foo.com" and also begin with the path name "/depts/novelties" to class Y. The guard state table 608 may be used to determine whether the data associated with a pattern may be overridden. For example, if the guard state 610 associated with a pattern indicates that there may be other patterns of interest for sub nodes of the search node, this may also be used to indicate that any such pattern match found for a sub node will override the data acquired for the previous search node. Furthermore, in some embodiments, the recognizer 134 keeps track of the position in the URL pattern lattice 200 at which data is found. The previous data may be overridden with new data if both the host and path indices associated with the previous data are less than or equal to the corresponding indices of the lattice node 202 for which the new data was found.

When the task of the recognizer 134 is to obtain data about the query field of the URL rather than URLs as a whole, data regarding the query field may be found for different lattice nodes. In other words, matching data table entries may be found for different lattice nodes. In some cases, the data may be complementary, such as when two different data fields of the URL are identified as search term fields and both are valid. In such cases, the data obtained for both data fields may be kept. In other cases, identifying a matching pattern table entry 402 for one lattice node 202 may indicate that a data field previously identified as search term field for a previous lattice node 202 is invalid. This may be the case, for example, if it is known, based on previously encountered URLs, that a data field with the keyword "S" is a search term field for all URLs matching "foo.com/depts" except for "foo.com/depts/novelties/" wherein it is known that the data field with the keyword "S" is not a search term field. In this case, identifying a matching pattern table entry 402 for the lattice node 202 corresponding to "foo.com/depts/novelties/" would override the previous data obtained from the data table 404 for the lattice node 202 "foo.com/depts".

To determine whether subsequent lattice nodes should override previously identified information about previous lattice nodes, entries in the data table 404 may be indicated as being positive or negative, for example, by setting the first bit of each data table entry 406 based on whether it is positive or negative. During the search of the data table 404, if a matching data table entry 406 is positive the corresponding data field of the URL is identified as being a search term field. If the matching data field entry is negative, the corresponding data field is identified as not being a search term field even if the same data field was previously identified as a search term based on finding a matching, positive data field entry for a previous lattice node 202.

In exemplary embodiments, the positive data table entries are stored to a first data table and negative data table entries may be stored to a second data table. The recognizer 134 may search for matching data table entries in both tables to determine whether the data fields of the URL are search term fields.

After obtaining the data from the data table 404, the process flow then advances to block 720. Furthermore, if at block 716 it is determined that the search node is not a pattern, the process flow may advance from block 716 to block 720, and block 718 is bypassed.

At block 720, a determination is made regarding whether additional patterns of interest may exist for lattice nodes that are sub nodes of the search node. As discussed in relation to block 518 of method 500, a record may be maintained of the lattice nodes 202 in the URL pattern lattice 200 that have been used as search nodes or have otherwise been processed. If the guard state 610 indicates that additional patterns of interest do not exist for the sub nodes of the search node, the process flow may advance to block 722, wherein all of the sub nodes of the search node are marked as "walked." Marking the sub nodes as "walked" has the effect that such nodes will not be used as search nodes.

If, at block 720, the guard state 610 indicates that additional patterns of interest may exist for the sub nodes of the search node, the process flow may advance to block 724 wherein the child nodes of the search node may be added to the agenda. As noted above, the child nodes are nodes that are directly below the search node. For example, with reference to FIG. 2, the node (2,1) has two child nodes, namely node (3,1) corresponding to host extension 214 of node (2,1) and node (2,2) corresponding to the path extension 216 of node (2,1). Thus, if node (2,1) is the current search node, nodes (3,1) and (2,2) may be added to the walk queue, depending on whether the child nodes have already been walked or marked as such at block 722. If a child node is marked as walked, the child node is not added to the agenda.

From blocks 722 and 724, the process flow advances to block 726. At block 726 a determination is made regarding whether additional pending lattice nodes are available in the agenda, which will be true if there are additional lattice nodes in the agenda that have not been marked as walked. If additional pending lattice nodes are available, the process flow advances to block 728.

At block 728, the search node is identified as the next available pending lattice node 202 in the agenda. The process flow then returns to block 708, and the process is repeated using the new search node. If, at block 726, there are no more pending lattice nodes 202 available in the agenda, this may indicate that there are no more lattice nodes 202 in the agenda or the remaining lattice nodes 202 in the agenda have been marked as walked. If, at block 726, there are no more pending lattice nodes 202 available in the agenda the process flow may advance to block 730.

At block 730, the process flow terminates and an output may be generated. In some embodiments, the recognizer 134 returns some or all of the data identified as related to the URL as its output. As discussed above, in relation to block 522 of method 500, the recognizer 134 may perform other actions upon identifying data as related to the URL, such as storing the data or invoking a caller-provided callback routine. In some embodiments, if no data is identified as related to the URL, default data is returned or used to perform actions. In some embodiments, the default data is pre-specified data. In other embodiments, default data is based on data previously identified as related to other URLs by the recognizer 134. In some embodiments, the recognizer 134 may then receive an additional URL from the Web activity data 132, and the method 500 restarts at block 502 with the new URL.

Returning to block 712, if a pattern table entry 402 matching the search node is not found, this may indicate both that the search node is not a pattern of interest and that there are no patterns of interest for any of the sub nodes of the search node. Thus, process flow may advance to block 722, wherein all of the sub nodes of the search node will be marked as walked. Thus, if the search node is the root node 212 of the URL pattern lattice 200, all of the lattice nodes below the root node 212 will be marked as walked and the process flow will terminate. In some embodiments, if the search node is the root node 212 and matching pattern table entry 402 is not found for the root node 212, the process flow advances from 712 to 730 directly. In some embodiments, if a matching pattern table entry 402 was not found in block 712, this indicates only that the search node is not a pattern of interest. In such embodiments, process flow may proceed from block 712 to block 724, with child nodes of the search node added to the agenda as pending lattice nodes 202. In some embodiments whether blocks 724, 730, or 722 follow block 712 when there is no match may depend on whether the search node is a root node 212 or on other considerations.

It will be appreciated that additional variations on the methods described above can be employed while remaining within the scope of the present claims. For example, in some embodiments, the information tables used by the recognizer 134 include both a guard table 600 and a guard state table 608. As described above in relation to FIG. 5, the root node 212 may be used to search the guard table 600 for a matching guard table entry 602. If a matching guard table entry 602 is found, a corresponding guard state 610 may be obtained from a guard state table 608. As described in relation to FIG. 7, the guard state 610 may indicate whether the search node, in this case the root node 212, is a pattern of interest and whether additional patterns of interest may exist for sub nodes of the search node. Depending on the guard state 610, data may be obtained from a corresponding entry in the guard data table 604, and the pattern table 400 may be searched using a child node of the root node 212. Further processing may proceed in accordance with method 700 described in FIG. 7. Additionally, in some embodiments, the guard state table 608 is combined with the data table 404. This may be accomplished by using the first two bits of each data table entry 406 to indicate the guard state. Upon identifying a matching pattern table entry 402, the data and the guard state may be obtained simultaneously from a corresponding entry in the data table 404. Additional variations may occur to one of ordinary skill in the art in light of teachings of the present specification.

Figure 8:
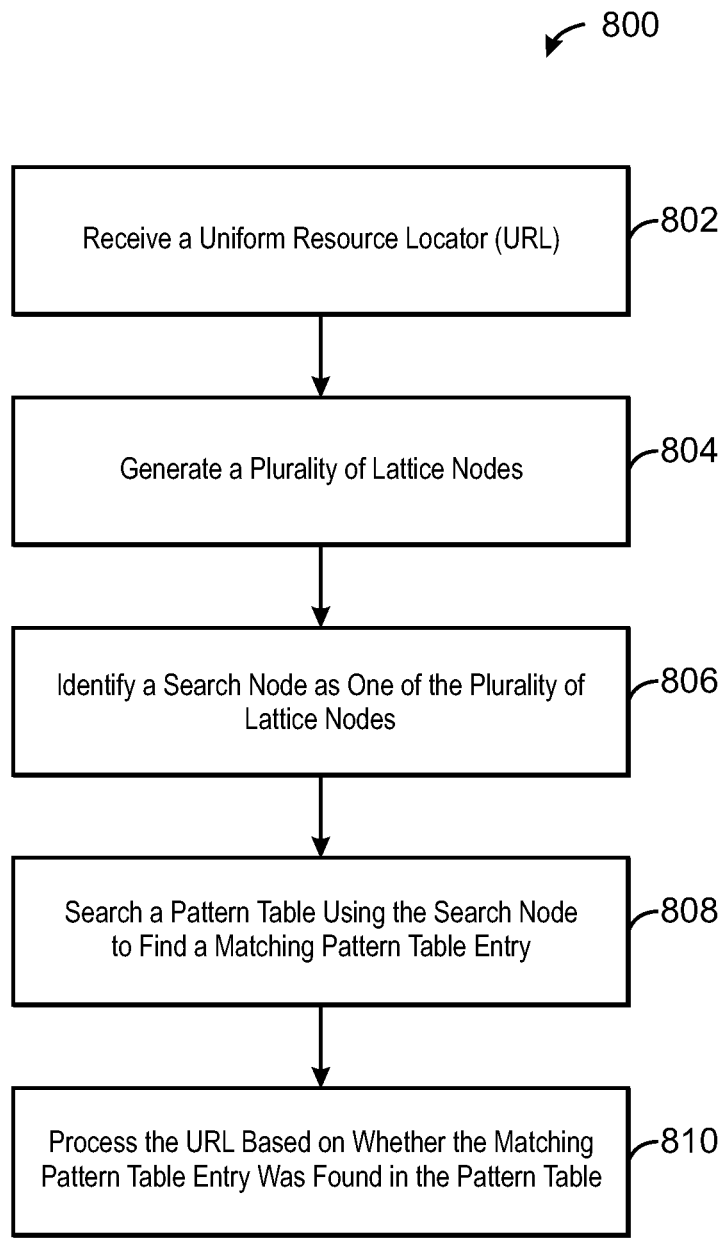
FIG. 8 is a process flow diagram of an overview of a method of processing Web activity data, in accordance with exemplary embodiments of the present invention.

FIG. 8 is a process flow diagram of an overview of a method of processing Web activity data 132, in accordance with exemplary embodiments of the present invention. The method is generally referred to by the reference number 800 and may be performed, for example, by the processor 104 using the recognizer 134, as discussed with respect to FIG. 1, above. The method 800 may begin at block 802, wherein a URL is received, for example, from the Web activity data 132. At block 804 a plurality of lattice nodes 202 corresponding to a URL pattern lattice 200 is generated as discussed above relation to FIGS. 1 and 2. Each of the plurality of lattice nodes includes a host component 208 corresponding to a portion of the URL and a path component 210 corresponding to a portion of the URL. At block 806, a search node may be identified as one of the plurality of lattice nodes of the URL pattern lattice 200. A hash code corresponding to the search node may be generated by combining the corresponding host hash from the host table 302 with the corresponding path hash form the path table 304, as described above in relation to FIG. 5. At block 808, the hash code corresponding to the search node may be used to search a pattern table 400 to find a matching pattern table entry 402. The pattern table 400 includes a plurality of pattern table entries corresponding to known lattice nodes of previously encountered URLs about which some information has been previously acquired, each pattern table entry representing a class of URLs (namely all URLs whose URL pattern lattice 200 contains a lattice node 202 that matches the pattern table entry 402) about which a decision has been made that it is desirable to similarly process or make similar decisions about any URL in the class. At block 810, the URL may be further processed based on whether a matching pattern table entry 402 was found in the pattern table 400. For example, in exemplary embodiments, if the matching pattern table entry 402 was found in the pattern table 400, the URL can be tagged as belonging to a specified category. In exemplary embodiments, processing the URL includes obtaining data from a data table 404 as discussed in relation to FIGS. 5 and 7. In some embodiments, data is obtained from an entry in the data table 404 that corresponds to the entry at which the matching pattern table entry 402 was found. In some embodiments, data is be obtained from the data table 404 by generating a hash code corresponding to a combination of the search node and a data field name corresponding to a data field of the URL.

In some embodiments, the method described above is repeated for a plurality of URLs, for example, each URL in the Web activity data 132. The information obtained about the URL by the recognizer 134 may be used by a URL analysis tool included in the computing device 102. For example, the URL analysis tool can be used to generate statistical data corresponding to search terms that have been employed by a plurality of users at a plurality of Websites. Identifying the search terms from the Web activity data 132 may enable the generation of various statistics regarding the interests of many users across a large number of Web pages. In exemplary embodiments, the statistical data is be compiled into a report, which may enable a Website administrator to better tailor the Website based on visitor interests and market trends. For example, the report can be used to identify competing Websites, search terms used at competing Websites, the more commonly visited Websites for a particular category of search terms, and the like. Exemplary techniques for generating the statistical data based the analysis of the Web activity data 132 are discussed in the commonly assigned U.S. patent application Ser. No. 12/618,151, filed on Nov. 19, 2009, entitled "Method and System for Processing Web Activity Data," by George Forman, et al., which is hereby incorporated by reference as though fully set forth in its entirety herein.

Figure 9:
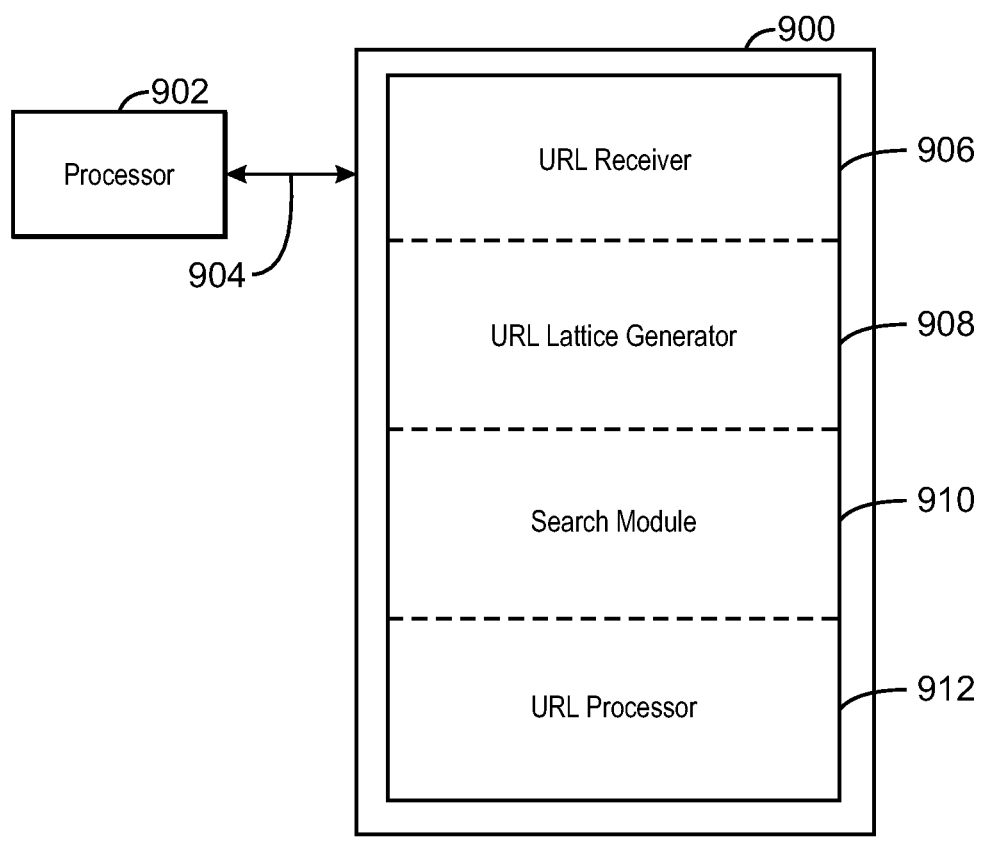
FIG. 9 is a block diagram showing a non-transitory, machine-readable medium that stores code configured to provide a URL recognizer, in accordance with an exemplary embodiment of the present invention.

FIG. 9 is a block diagram showing a non-transitory, machine-readable medium that stores code configured to provide a URL recognizer 134, in accordance with an exemplary embodiment of the present invention. The non-transitory, machine-readable medium is referred to by the reference number 900. The non-transitory, machine-readable medium 900 can comprise RAM, a hard disk drive, an array of hard disk drives, an optical drive, an array of optical drives, a non-volatile memory, a universal serial bus (USB) drive, a digital versatile disk (DVD), a compact disk (CD), and the like.

In exemplary embodiments, the non-transitory, machine-readable medium 900 stores a collection of data comprising Web activity data 132 generated by a plurality of users at a plurality of Webpages. The Web activity data 132 can include a plurality of URLs such as query URLs. The non-transitory, machine-readable medium 900 may be accessed by a processor 902 over a communication path 904.

As shown in FIG. 9, the various exemplary components discussed herein can be stored on the non-transitory, machine-readable medium 900. A first region 906 on the non-transitory, machine-readable medium 900 can include a URL receiver configured to receive a URL, for example, from the Web activity data 132. A region 908 can include a URL lattice generator configured to generate a plurality of lattice nodes, wherein each of the plurality of lattice nodes includes a host component 208 corresponding to a portion of the URL and a path component 210 corresponding to a portion of the URL. A region 910 can include a search module configured to identify a search node as one of the plurality of lattice nodes 202 and search a pattern table 400 using the search node to find a matching pattern table entry 402, the pattern table 400 comprising a plurality of pattern table entries corresponding to known lattice nodes of previously encountered URLs. A region 912 can include a URL processor configured to process the URL based on whether the matching pattern table entry 402 was found in the pattern table 400. Although shown as contiguous blocks, the software components can be stored in any order or configuration. For example, if the non-transitory, machine-readable medium 900 is a hard drive, the software components can be stored in non-contiguous, or even overlapping, sectors.

What is claimed is:

1. A method, comprising:
   generating a plurality of lattice nodes in a storage system based on a Uniform Resource Locator (URL), wherein each of the plurality of lattice nodes includes a host component corresponding to a portion of the URL and a path component corresponding to a portion of the URL;
   identifying one of the plurality of lattice nodes as a search node;
   searching a pattern table database using the search node to find a matching pattern table entry, the pattern table database comprising a plurality of pattern table entries corresponding to known lattice nodes associated with previously encountered URLs; and
   processing the URL based on whether the matching pattern table entry was found in the pattern table database.

2. The method of claim 1, wherein each pattern table entry comprises a pattern hash code computed based on a corresponding known lattice node and wherein searching the pattern table database comprises generating a search hash code based on the search node and wherein the pattern hash code of the matching pattern table entry matches the search hash code.

3. The method of claim 1, comprising searching a guard table using the search node to find a corresponding guard table entry, wherein the guard table comprises a plurality of guard table entries corresponding to most general known lattice nodes based on previously encountered URLs.

4. The method of claim 1, comprising, upon finding the matching pattern table entry, obtaining a guard state from a corresponding entry in a guard state table and searching the pattern table database using a different one of the plurality of lattice nodes based, at least in part, on the guard state.

5. The method of claim 4, wherein each entry in the guard state table includes an indication of whether the corresponding pattern table entry corresponds to a pattern of interest and an indication of whether other lattice nodes obtained by recursively extending the search node may be patterns of interest.

6. The method of claim 1, further comprising:
   identifying in the plurality of lattice nodes, a set of child nodes of the search node and repeating the steps of searching the pattern table database, processing the URL, and identifying additional child nodes based on some or all of the child nodes being treated as further search nodes.

7. The method of claim 6, wherein:
   identifying a set of child nodes comprises adding the identified child nodes to an agenda of pending lattice nodes; and
   identifying one of the plurality of lattice nodes as a search node comprises:
   identifying a most-general lattice node as an initial search node;
   identifying a pending lattice node in the agenda of pending lattice nodes as a subsequent search node; and
   removing the identified pending lattice node from the agenda.

8. The method of claim 1, wherein processing the URL comprises obtaining data from a corresponding entry in a data table if the matching pattern table entry was found in the pattern table database.

9. The method of claim 8, wherein the data comprises a category indication and wherein processing the URL comprises associating the category indication with the URL.

10. The method of claim 1, wherein processing the URL comprises:
    if the matching pattern table entry was found in the pattern table database, associating the URL with a specified category; and
    if the matching pattern table entry was not found in the pattern table database, not associating the URL with the specified category.

11. A computer system, comprising:
    a processor that is configured to execute machine-readable instructions; and
    a memory device that stores instruction modules that are executable by the processor, the instruction modules comprising:
    a URL receiver configured to receive a URL;
    a URL lattice generator configured to generate a plurality of lattice nodes, wherein each of the plurality of lattice nodes includes a host component corresponding to a portion of the URL and a path component corresponding to a portion of the URL;
    a search module configured to identify a search node corresponding to one of the plurality of lattice nodes and search a pattern table database using the search node to find a matching pattern table entry, the pattern table database comprising a plurality of pattern table entries corresponding to known lattice nodes associated with previously encountered URLs; and a URL processor configured to process the URL based on whether a matching pattern table entry was found in the pattern table database.

12. The computer system of claim 11, wherein the URL lattice generator is configured to generate a first table comprising a plurality of first hash codes corresponding to components of the URL of a first component type and a second table comprising a plurality of second hash codes corresponding to components of the URL of a second component, wherein the search module is configured to identify the search node by combining one of the plurality of first hash codes from the first table with one of the plurality of second hash codes from the second table.

13. The computer system of claim 11, wherein the URL processor is configured to obtain a guard state corresponding to the search node if the matching pattern table entry was found in the pattern table database, wherein the guard state includes a first indicator that indicates whether data corresponding to the search node may be found in a data table and a second indicator that indicates whether additional matching pattern table entries may be found in the pattern table database for sub nodes of the search node.

14. The computer system of claim 13, comprising an agenda configured to determine which of the plurality of lattice nodes are used as search nodes:
wherein if the guard state indicates that a pattern of interest may exist for a child node of the search node, child nodes of the search node are added to the agenda; and
if the guard state indicates that the pattern of interest does not exist for any child node of the search node, the child nodes of the search node are marked as walked.

15. The computer system of claim 11, comprising a data table generated based, at least in part, on the output of a classifier generated by processing previously encountered URLs, and wherein the URL processor is configured to receive data from the data table if the matching pattern table entry is found in the pattern table database.

16. The computer system of claim 15, wherein the URL processor is configured to:
generate a data field hash code corresponding to a combination of the search node and a field name included in a query field of the URL;
use the data field hash code to search the data table to find a matching hash code; and
if the matching hash code is found in the data table, identify the field of the URL as a search term field.

17. A non-transitory, computer readable medium, comprising code configured to direct a processor to:
generate a plurality of lattice nodes, wherein each of the plurality of lattice nodes includes a host component corresponding to a portion of a Uniform Resource Locator (URL) and a path component corresponding to a portion of the URL;
identify one of the plurality of lattice nodes as a search node;
search a pattern table database using the search node to find a matching pattern table entry, the pattern table database comprising a plurality of pattern table entries corresponding to known lattice nodes associated with previously encountered URLs; and
process the URL based on whether the matching pattern table entry was found in the pattern table database.

18. The non-transitory, computer readable medium of claim 17, comprising code configured to direct the processor to obtain a guard state corresponding to the search node if the matching pattern table entry was found in the pattern table database, wherein the guard state includes a first indicator that indicates whether data corresponding to the search node may be found in a data table and a second indicator that indicates whether additional matching pattern table entries may be found in the pattern table database for sub nodes of the search node.

19. The non-transitory, computer readable medium of claim 17, comprising code configured to direct the processor to receive data from a data table if the matching pattern table entry is found in the pattern table database, wherein the data table is generated based, at least in part, on the output of a classifier generated by processing previously encountered URLs.

20. The non-transitory, computer readable medium of claim 17, comprising code configured to direct the processor to:
generate a data field hash code corresponding to a combination of the search node and a field name included in a query field of the URL;
use the data field hash code to search the data table to find a matching hash code in the data table; and
if the matching hash code is found in the data table, identify the field of the URL as a search term field.

* * * * *

UNITED STATES PATENT AND TRADEMARK OFFICE
CERTIFICATE OF CORRECTION

PATENT NO. : 8,799,310 B2  Page 1 of 1
APPLICATION NO. : 12/842434
DATED : August 5, 2014
INVENTOR(S) : Kirshenbaum It is certified that error appears in the above-identified patent and that said Letters Patent is hereby corrected as shown below:

In the Specification

Column 11, line 12, delete "Locators,"" and insert -- Identifiers," --, therefor.

Signed and Sealed this
Twenty-fifth Day of November, 2014

Michelle K. Lee
*Deputy Director of the United States Patent and Trademark Office*